(12) United States Patent
Floriach et al.

(10) Patent No.: US 7,240,849 B2
(45) Date of Patent: Jul. 10, 2007

(54) GLYPH PATTERN GENERATION AND GLYPH PATTERN DECODING

(75) Inventors: Carles Ruiz Floriach, Mataro (ES); Manuel Angel Albarran Moyo, Barcelona (ES)

(73) Assignee: Hewlett-Packard Development Company, L.P., Houston, TX (US)

( * ) Notice: Subject to any disclaimer, the term of this patent is extended or adjusted under 35 U.S.C. 154(b) by 268 days.

(21) Appl. No.: 10/927,915

(22) Filed: Aug. 27, 2004

(65) Prior Publication Data

US 2006/0043203 A1 Mar. 2, 2006

(51) Int. Cl.
*G06K 19/06* (2006.01)

(52) U.S. Cl. .................. 235/494; 235/454; 235/472.01

(58) Field of Classification Search ................ 235/494, 235/454, 462.09, 472.01
See application file for complete search history.

(56) References Cited

U.S. PATENT DOCUMENTS

| | | | | |
|---|---|---|---|---|
| 5,221,833 A * | 6/1993 | Hecht | | 235/494 |
| 5,477,012 A | 12/1995 | Sekendur | | 178/18.09 |
| 5,852,434 A | 12/1998 | Sekendur | | 345/179 |
| 6,182,901 B1 * | 2/2001 | Hecht et al. | | 235/494 |
| 6,296,192 B1 * | 10/2001 | Hecht | | 235/494 |
| 6,427,920 B1 * | 8/2002 | Bloomberg et al. | | 235/494 |
| 6,507,339 B1 | 1/2003 | Tanaka | | 345/178 |
| 6,594,406 B1 * | 7/2003 | Hecht | | 382/306 |
| 6,654,007 B2 | 11/2003 | Ito | | 345/175 |
| 6,667,695 B2 | 12/2003 | Pettersson et al. | | 341/5 |
| 6,674,427 B1 | 1/2004 | Pettersson et al. | | 345/179 |
| 6,714,311 B2 | 3/2004 | Hashimoto | | 356/623 |
| 6,752,317 B2 * | 6/2004 | Dymetman et al. | | 235/462.45 |
| 6,768,560 B1 * | 7/2004 | Greene et al. | | 358/3.28 |
| 6,871,789 B2 * | 3/2005 | Hilton et al. | | 235/494 |
| 2003/0085884 A1 | 5/2003 | Pettersson et al. | | 345/179 |
| 2003/0152293 A1 * | 8/2003 | Bresler et al. | | 382/305 |
| 2004/0075851 A1 * | 4/2004 | Hecht | | 358/1.9 |
| 2004/0135776 A1 * | 7/2004 | Brouhon | | 345/179 |
| 2004/0150845 A1 * | 8/2004 | Brouhon | | 358/1.9 |
| 2005/0024346 A1 * | 2/2005 | Dupraz et al. | | 345/179 |

FOREIGN PATENT DOCUMENTS

WO WO-03001442 1/2003

OTHER PUBLICATIONS

Indianic Infotech Limited, "Software Development: Digital Pen & Paper", http://www.indianic.com/software.html, Web page downloaded Jul. 1, 2004,(1998-2004), 1-3.
Nokia Corporation, "Introduction to Anoto Functionality", *Version 1.0*, Forum.Nokia.com, (Dec. 12, 2003),1-9.

* cited by examiner

*Primary Examiner*—Steven S. Paik
(74) *Attorney, Agent, or Firm*—Schwegman, Lundberg, Woessner & Kluth, P.A.

(57) ABSTRACT

Unique patterns of glyphs are represented within blocks. Each pattern identifies a unique position on a unit of print media. Moreover, a desired current position for any given glyph or subset of glyphs can be derived from captured portions of different ones of the unique patterns. The unique patterns are outputted for subsequent delivery to instances of the unit of print media.

24 Claims, 6 Drawing Sheets

GLYPH PATTERN GENERATION AND GLYPH PATTERN DECODING

BACKGROUND

Digital pen and paper technology has provided tremendous opportunities to consumers. Digital paper is paper with printed patterns embedded thereon. These patterns may or may not be visible to an observer. That is, in some instances the patterns are printed using infrared ink onto the surface of the paper, such that the patterns are observable to infrared cameras but not to an observer's eyes. A digital pen includes a camera that captures images representing select patterns or select portions of the patterns recorded on the digital paper. The image is translated into coordinate values in order to resolve the digital pen's position over a surface of the digital paper. When obtaining the position, the orientation of the digital pen is also resolved.

Calculating a digital pen's true position and orientation over the surface of digital paper presents unique opportunities, such as permitting an artist's drawings to be digitally captured, permitting a writer's handwriting to be captured and possibly automatically translated into electronic data structures (e.g., characters, etc.), and the like. However, resolving the position is a restrictive exercise because often the algorithm to decode the position is dependent upon sizes originally selected for encoding the patterns on the digital paper. Thus, digital paper having patterns of sizes 5×5 are generally not compatible with digital pens that capture blocks of sizes 6×6. Moreover, this incompatibility for different pattern sizes exists even when the patterns themselves are the same.

DETAILED DESCRIPTION

Figure 1:
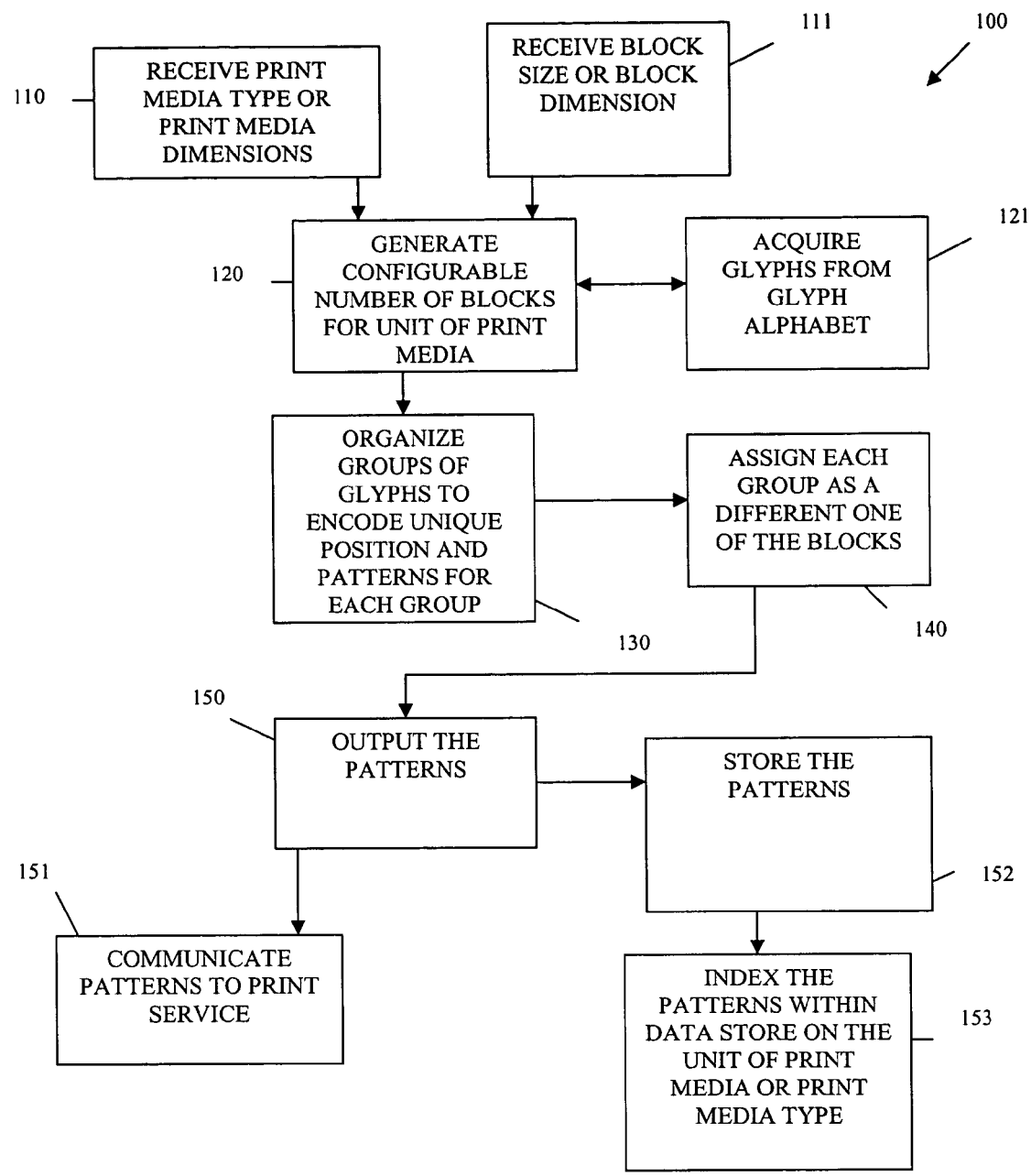
FIG. 1 is a diagram of a method for encoding glyphs, according to an example embodiment.

FIG. 1 is a diagram of one method 100 for encoding glyphs, according to an example embodiment. The method 100 (hereinafter "encoder") is implemented in a machine-accessible and readable medium and is optionally accessible over a network. The encoder may be implemented in software, hardware, or combinations of software and hardware. In one embodiment, the encoder is implemented within a printing driver service associated with an infrared printing system. The encoder generates and outputs novel patterns of glyphs for a given unit of print media.

A glyph is a figure which is used as a variable to represent information. That is, an alphabet of glyphs is combined to encode or represent information. Generally, a single glyph represents a small amount of information. For example, consider a glyph alphabet which include to glyph characters, such that one glyph represents a single bit of information having a bit value of "1" and the remaining glyph represents a bit having a bit value of "0."

Glyphs are generally arranged along an imaginary grid and read in a pre-defined order to convey information. Because a single glyph generally represents a small amount of information, glyphs are often in groups and processed as groups. Each group of glyphs represents a glyph pattern or subset of one or more glyph patterns.

Glyphs may be asymmetric meaning that figures of a particular glyph alphabet are not symmetrical. Asymmetric glyphs may be useful to include reference locations for particular glyph patterns. These reference locations are useful in resolving a beginning reference frame and orientation for a reading device that is reading a particular portion of the patterns to resolve an orientation. Glyph patterns may also be symmetrical and include asymmetric properties to help resolve reference frames and orientations. Still other glyph patterns use a combination of glyphs to form asymmetric figures. Any of these techniques or others may be used with the encoder presented in FIG. 1.

Initially, an alphabet of glyphs is selected for the encoder. Each glyph is capable of representing (e.g., maps to) one or more bits of information. At, 110, a variety of configurable parameters may be received by the encoder that permits the encoder to determine a reference grid for a given unit of print media. That is, a height and width of paper media may be supplied to the encoder. This information represents two dimensions within which the encoder can establish a reference grid to generate glyph patterns. In some embodiments, the dimensions of a given unit of media may be acquired from a table lookup or data store query based on a provided type of print media. For example, the encoder may receive as an initial processing parameter a type defined as "A4 paper media."

In still more embodiments, at 111, parameters may be supplied to the encoder that define block sizes or block dimensions for glyph patterns. A block is a set or group of glyphs selected from the chosen glyph alphabet that conveys a discrete piece of information. In some embodiments, that discrete piece of information is a coordinate within the reference grid representing a row (width location) and a column (height location). The group of glyphs within each block is a unique pattern, and each pattern is unique for an entire instance of the given unit of print media.

The combination of print media type, print media dimensions, block size, and/or block dimensions (collectively referred to as configuration information) permit the encoder to resolve a reference grid for a given unit of print media and to resolve a size of and number of unique glyph patterns for a single instance of that unit of print media. Some of the configuration information may be pre-defined within the encoder while other portions of the information may be supplied as parameters to the encoder. Additionally, in some cases all of this information may be supplied as parameters to the encoder. In this way, the encoder may self configure itself and its reference grids used for glyph pattern encoding dynamically for a variety of print media, such as paper, envelopes, labels, cards, post-it notes, and the like. It should be noted that print media may also include non-paper based products, such as cloth, metal, wood, glass, and more recently food based products.

After proper configuration of the reference grid for a given unit of print media, a number of blocks for the unit of print media are generated at 120. Again, at 121, this entails properly selecting glyphs from a chosen glyph alphabet. At 130, the glyphs are organized into groups within each block and each block is a unique and continuous pattern of the glyphs. Moreover, the blocks are assigned identifiers such that each block corresponds to a position within the reference grid associated with the given unit of print media. Accordingly, at 140, each group of organized glyphs is associated with a different one of the blocks.

When the blocks are organized, the organization creates an encoding for each block or for each unique pattern of glyphs. Glyphs of a single pattern or block cooperate to encode their position within the reference grid on the unit of print media. There is no restriction on how this is achieved with embodiments of this invention.

Thus, some glyphs of a block may encode position information along a first dimension, such as an X axis or width associated with the reference grid, while other glyphs may encode position information along a second dimension, such as a Y axis or height associated with the reference grid. In other situations, a single glyph may encode both X and Y axis position information. Moreover, the number of bits associated with each glyph for position information may be different.

For example, one encoding scheme may entail associating 2 bits for the X axis and 1 bit for the Y axis within each encoded glyph of a block. In this example, if the configured block size is 3×3, then each block is capable of using glyphs in unique patterns to convey $2^2$ (3*3) positions in the X axis and $2^1$ (3*3) positions in the Y axis; resulting in rectangular block patterns of glyphs. If the number of bits encoded in each glyph were the same for both X and Y axis, then the resulting block patterns are squares.

It should also be noted that within each block some glyphs may not encode position information. Some glyphs may be used to convey other desired information. Moreover, in some cases glyphs are repeated within a given block for purposes of adding redundancy and make the encoding more error resilient. Therefore, the combined organization of glyphs within a single block cooperates to convey position information within the reference grid associated with the given unit of print media. But, individual glyphs or sub-grouping of glyphs within a given block may also convey other useful information not necessarily associated with position information.

At 150, once each block for the reference grid is organized and encoded with glyphs, the patterns which represent the blocks on the grid are outputted from the encoder. In one embodiment, at 151, outputting entails communicating the patterns for the given unit of print media to a print service. The print service may include an infrared printer that is capable of receiving the patterns and printing them on instances of a unit of print media.

In some instances, the patterns are stored, at 152; storage may be in memory or permanent storage. Some storage may be associated with a data store, such that, at 153, the patterns may be indexed with the data store with the unit of print media or a type of media associated with the unit of print media. This may be useful, for subsequent iterations of the encoder, where a given unit of print media has already been processed and the patterns known. Under these circumstances, the encoder may search the data store on the unit of print media or a print media type and acquire the patterns without having to regenerate or re-encode the patterns.

Storing the patterns and associating the patterns with the given unit of print media or print media types may present a variety of other opportunities. For example, a service over the Internet may be established to acquire patterns for download to an infrared print driver for given types of print media. Alternatively, the patterns may be distributed on removable medium and interfaced to a processing device where they are uploaded into an infrared printer. Thus, in some embodiments, the encoder can be processed for a variety of different types or print media and the resulting patterns distributed in a variety of useful manners.

As will be discussed in greater detail herein and below, the patterns are novel because they are capable of being decoded to resolve an orientation of a digital input device over the surface of an instance of print media which has the patterns printed thereon. What is novel about this is that the captured image from the input device does not have to correspond to a whole pattern (block) in order for the input device (in cooperation with a processing device) to resolve an orientation over a surface of the media instance. The decoding techniques of the patterns can resolve not only block positions of an original reference grid, but can also resolve positions of individual glyphs which are themselves associated with multiple different patterns.

Figure 2:
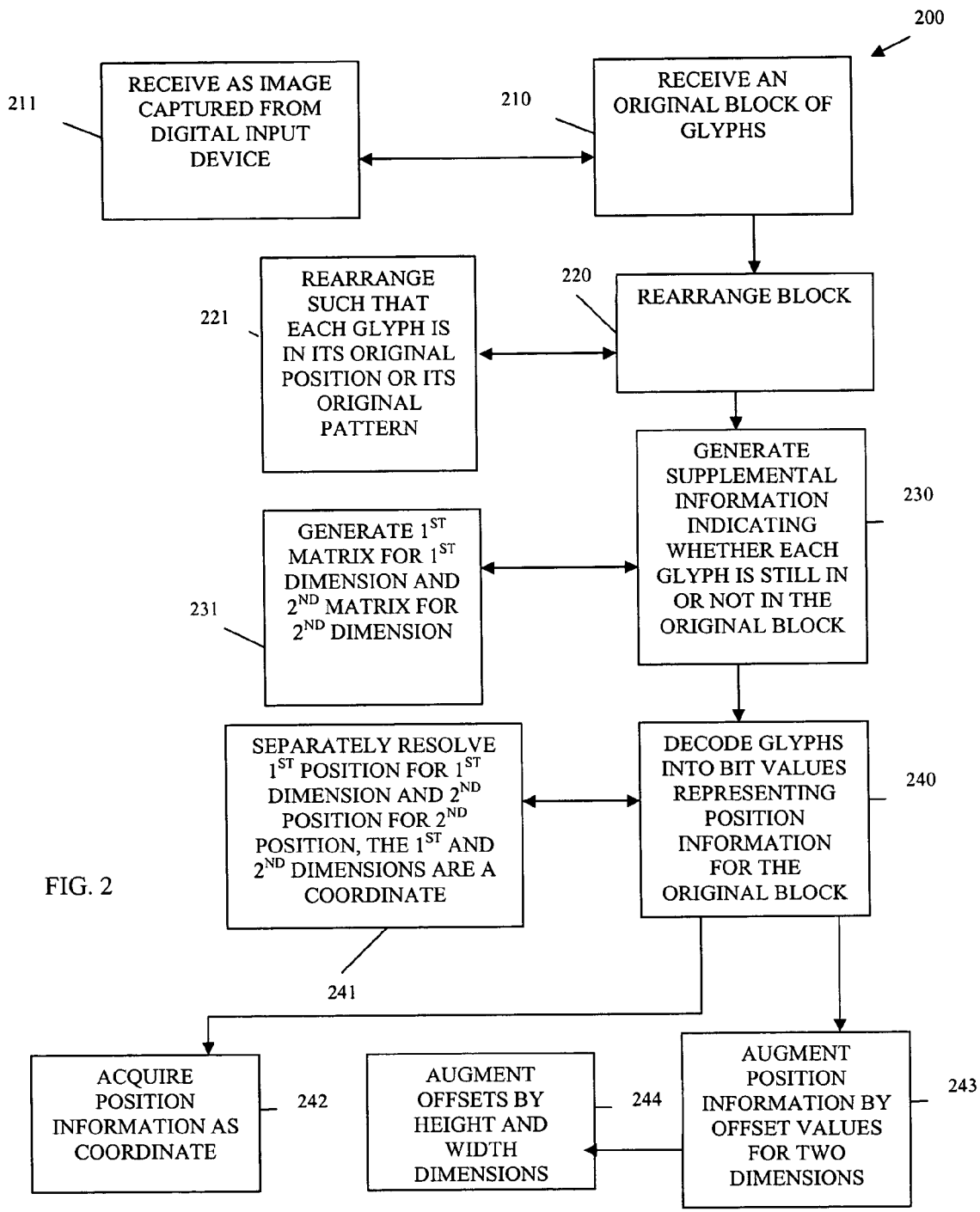
FIG. 2 is a diagram of a method for decoding glyphs, according to an example embodiment.

FIG. 2 is a diagram of one method 200 for decoding glyph positions, according to an example embodiment. The method 200 (hereinafter "decoder") is implemented in a machine-accessible and readable medium and is optionally accessible over a network. In one embodiment, the decoder decodes glyphs originally coded by the method 100 (encoder) of FIG. 1. In one embodiment, the decoder is implemented in software, hardware, or combinations of hardware and software. The decoder may be implemented in whole or in part within a digital input device, such as digital pen, stylus, camera, etc. Alternatively, the decoder may be implemented in whole or in part within a processing device that is capable of processing images.

At 210, the decoder receives a captured original block of glyphs. In one embodiment, at 211, this original block of glyphs is captured and received from a digital input device (e.g., digital pen, stylus, camera, etc.). The original block of glyphs is generally associated with glyphs that are associated with different unique patterns or blocks. That is, some glyphs in the captured block are associated with different unique patterns; each unique pattern itself decodes to a position within a reference grid associated with an instance of a unit of print media. However, the glyphs of a unique pattern cooperate to convey position information within the reference grid (as discussed above with the encoder); thus, since the captured block may not be a whole block of a single pattern but rather a combination of patterns, the decoder performs novel decoding processing described below to resolve the position of the captured original block to a reference grid associated with the instance of the unit of print media.

To do this, at 220, the decoder rearranges glyphs associated with the original block. In one embodiment, at 221, this entails separating the glyphs of the original block and reordering them into an order that each would have appeared in if they were within their original patterns. For example consider the following captured 3×3 block of glyphs, where each glyph is labeled as V with a subscript corresponding to its location within the captured block, In the example presented in Table A below, the X axis (width) of the captured block increases from left to right and the Y axis (height) increases from the top down. The captured block can be viewed as a matrix M (also referred to as captured block M):

TABLE A

Example Captured Block M

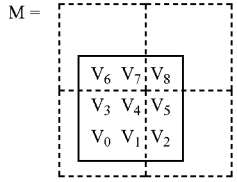

One way to determine where each glyph's location was within its respective original pattern is to determine a width (X axis) offset and a height offset (Y axis) for the captured block. The X offset is the degree to which a complete pattern is found within the X axis, and the Y offset is the degree to which a complete pattern is found with the Y axis. The complete patterns are with respect to the captured and original block vis-á-vis known patterns for the encoded glyphs and a reference grid associated with the unit of print media. In the example of Table A, it can be seen that M is one glyph off from being completely within an original block for the X axis. Thus, M has an X offset of 1. M is two glyphs off from being completely within an original block for the Y axis. Therefore, M has a Y offset of 2.

Once the offset is determined, calculations can be made against each glyph in a captured block to determine how it is to be rearranged in order to resolve an original location for each glyph in the captured block as it would have appeared in the pattern to which it was natively associated with. This calculation is processed for each glyph's X and Y axis. The calculation for the X axis is: a glyph's captured X position +X offset MOD block width, where MOD is a modulus operation returning an integer value for the remainder associated with a division operation. The calculation for the Y axis is similar: a glyph's captured Y position +Y offset MOD block height.

So, returning to the working example. The rearranged X position for the captured glyph $V_0$ is as follows for the X position: 0 (captured X position)+1 (X offset value) MOD 3 (captured block width)=1. Therefore, the rearranged X position for the captured $V_0$ glyph is 1. The rearranged Y position for the captured glyph $V_0$ is as follows for the Y position: 2 (captured Y position)+2 (Y offset value) MOD 3 (block height)=1. So, $V_0$ will occupy a coordinate position (C) of C=(1, 1) in the rearranged block.

In the example of captured block M, the glyphs were represented in shorthand as $V_0$ through $V_8$. These are actually represented as coordinates within a grid for the captured block M, such that each glyph has a position along an X axis and Y axis of that grid. Thus, in our present example M, the glyphs appear as follows:

TABLE B

Coordinate Values for Glyphs of M

| M = | 0 | 1 | 2 | |
|---|---|---|---|---|
| 0 | $V_6 = 0, 0$ | $V_7 = 1, 0$ | $V_8 = 2, 0$ | Y |
| 1 | $V_3 = 0, 1$ | $V_4 = 1, 1$ | $V_5 = 2, 1$ | A X I S |
| 2 | $V_0 = 0, 2$ | $V_1 = 1, 2$ | $V_2 = 2, 2$ | |

X Axis

If one continues to perform the rearrangement on the example captured block M, using the calculation and coordinates presented above one obtains a rearranged block M' which appears as follows:

TABLE C

Rearranged M as M'

| M' = | 0 | 1 | 2 | |
|---|---|---|---|---|
| 0 | $V_5 = 0, 0$ | $V_3 = 1, 0$ | $V_4 = 2, 0$ | Y |
| 1 | $V_2 = 0, 1$ | $V_0 = 1, 1$ | $V_1 = 2, 1$ | A X I S |
| 2 | $V_8 = 0, 2$ | $V_6 = 1, 2$ | $V_7 = 2, 2$ | |

X Axis

Next, at 230, supplemental information is generated, which indicates whether each glyph in the rearranged block is still in its captured original block when rearranged within the rearranged block. This is achieved, in one embodiment, at 241, for each separate dimension of the original captured block. That is, each glyph is associated with a height dimension and a width dimension. So, a first dimension supplemental matrix is derived to represent an X axis or width and a second dimension supplemental matrix is derived to represent a Y axis or height.

For example, initially the captured block has its own natively captured orientation. The decoder inspects this captured orientation and determines that a whole pattern may be partially achieved along the X axis with a portion of the glyphs in the captured block. Similarly, a whole pattern may be partially achieved along the Y axis with a different portion of the glyphs in the captured block. The result is that imaginary lines are drawn to identify potentially two separate patterns along the X axis and two along the Y axis. The two X axis blocks (patterns) are labeled X and X−1, and the two Y axis blocks (patterns) are labeled Y and Y−1. The individual glyphs in the original block and the rearranged block (M and M') are then inspected to determine if a particular original glyph is in the same blocks for each dimension, and if they are then a 0 is recording in the appropriate dimension's supplemental matrix.

This is best illustrated visually. Consider M and the generated M' having placement within X and X−1 and Y and Y−1:

TABLE D

Placement of M and M'
Relative to one another

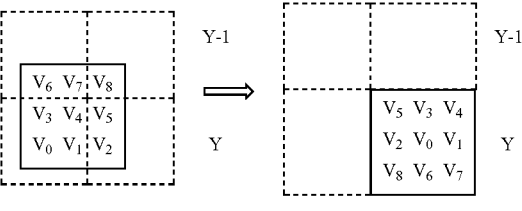

With this information M' is now re-expressed for the X dimension and then again for the Y dimension and the first and second supplemental matrixes derived are as follows:

TABLE E-1

First Dimension (X axis) Supp. Matrix $M'_X =$ $VX_5$ $VX_3$ $VX_4$     $SUPP_x =$ 0 −1 −1
      $VX_2$ $VX_0$ $VX_1$               0 −1 −1
      $VX_8$ $VX_6$ $VX_7$               0 −1 −1

TABLE E-2

Second Dimension (Y axis) Supp. Matrix $M'_Y =$ $VY_5$ $VY_3$ $VY_4$     $SUPP_y =$ 0 0 0
      $VY_2$ $VY_0$ $VY_1$               0 0 0
      $VY_8$ $VY_6$ $VY_7$               −1 −1 −1

Each position in the supplemental matrixes includes a value of 0 or −1. 0 indicates that a particular glyph in M (the originally captured glyphs) is also located in the same block (X or Y) of M' (the rearranged glyphs). Conversely, −1 indicates that a particular glyph of M is not located within the same block of M' (the particular glyph is in block X−1 or Y−1).

Armed with this information, at 240, the glyphs of the captured original block are translated into their bit values and decoded to represent position information for the original block. An example algorithm that translates the bit values using the above derived information is provided with the description of FIG. 4 below, where the values associated with the supplemental matrixes are identified as bit locations associated with glyph bit values.

In some embodiments, at 241, a first position for a first dimension (X axis or width) is resolved and then a second position for a second dimension (Y axis or height) is resolved. The two resolved positions represent a coordinate value for the original captured block within a reference grid associated with the given instance of the unit of print media.

Accordingly, in some embodiments, at 242, position information is acquired and represented as a coordinate within the reference grid. The coordinate is dynamically supplied to a tracking or recording service that interfaces and monitors movements of a digital input device (e.g., digital pen, stylus, camera, etc.) being manipulated by a writer. The movements are then oriented with respect to the coordinate and tracked; it is as if the writer is writing on an electronic media which models the instance of the unit of print media (e.g., piece of paper, etc.).

In one embodiment, at 243, the resolved position information is augmented by offset values for two dimensions. That is, at 244, the two dimensions of height and width include offsets for each individual dimension, where the width is an X dimension and the height is a Y dimension (X and Y=two dimensions). An offset is similar to the discussion above.

One example way to calculate an X position of a coordinate for the original captured block, is illustrated by the following equation: X position=X block position (calculated by the algorithm presented in FIG. 4 below)*block width−X axis offset for the original captured block. The Y position=Y block position (calculated by the algorithm presented in FIG. 4 below)*block height−Y axis offset for the original captured block.

Figure 3:
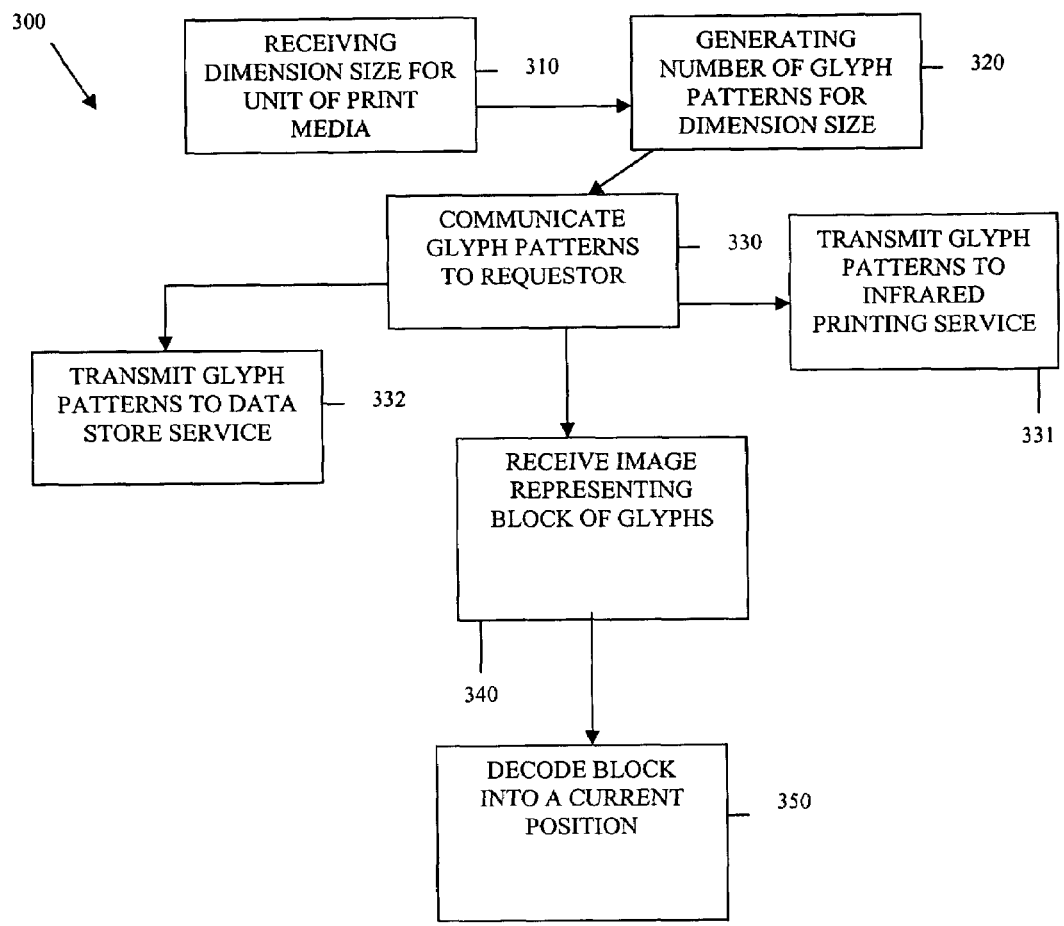
FIG. 3 is a diagram of another method for encoding glyphs, according to an example embodiment.

FIG. 3 is a diagram of one method 300 for encoding and decoding glyphs, according to an example embodiment. The method (hereinafter "service") is implemented in a machine-accessible and readable and optionally accessible over a network. The medium may be a plurality of media that is logically associated with one another to perform portions of the processing. Moreover, the medium includes instructions, the instructions when loaded to one or more processing devices and accessed performs the processing depicted herein. Some portions of the processing may execute on a different processing device than other portions of the processing. Moreover, the instructions may be downloaded from remote memory or storage to processing devices or uploaded from removable media to one or more processing devices.

In one embodiment, different aspects of the processing perform the method 100 (encoder) of FIG. 1 and other aspects of the processing perform the method 200 (decoder) of FIG. 2. Initially, at 310, a dimension size for a unit of print media is received. Receipt of the dimension size may be from tables, data structures, memory, storage, files, data stores, or from a user interfaced to the processing.

The dimension size permits the processing to resolve and acquire a reference grid for the given unit of print media. Once the reference grid is known, at 320, a number of glyph patterns for the received dimension size and reference grid are produced. Each pattern represents a unique block of glyphs, and each block of glyphs encode each block's position within the reference grid.

The glyphs may be subsequently acquired in captured blocks on instances of the unit of print media in combinations that span multiple original patterns and may be decoded by other portions of the processing to resolve the positions or orientations of the captured blocks with respect to the reference grid associated with the instances of the unit of print media.

At 330, the glyph patterns may be communicated to a requester. A requestor may be a printer driver or system, another service, such as a data store service, and the like. For example, at 331, communication to a requestor identified as an infrared printing service may occur by transmitting the patterns for the given unit of print media to the infrared printing service. The printing service then prints the patterns in infrared ink onto a surface of an instance of the given unit of print media. As another example, at 332, communication to a requestor identified as a data store service may occur by transmitting the glyph patterns to the data store service. The data store service then indexes and associates the patterns with a type or print media or the given unit of print media.

When an instance of the given unit of print media is subsequently interfaced with a digital input device, such as a digital pen, and the pen is placed over the surface having the previously printed patterns an image is captured. The image is a captured block of glyphs representing portions of the original patterns. This image is received by other portions of the processing, at 340. Next, at 350, processing similar to what was described above with method 200 (decoder) occurs on the captured block to decode the block into a current position for the digital pen over the surface.

Figure 4:
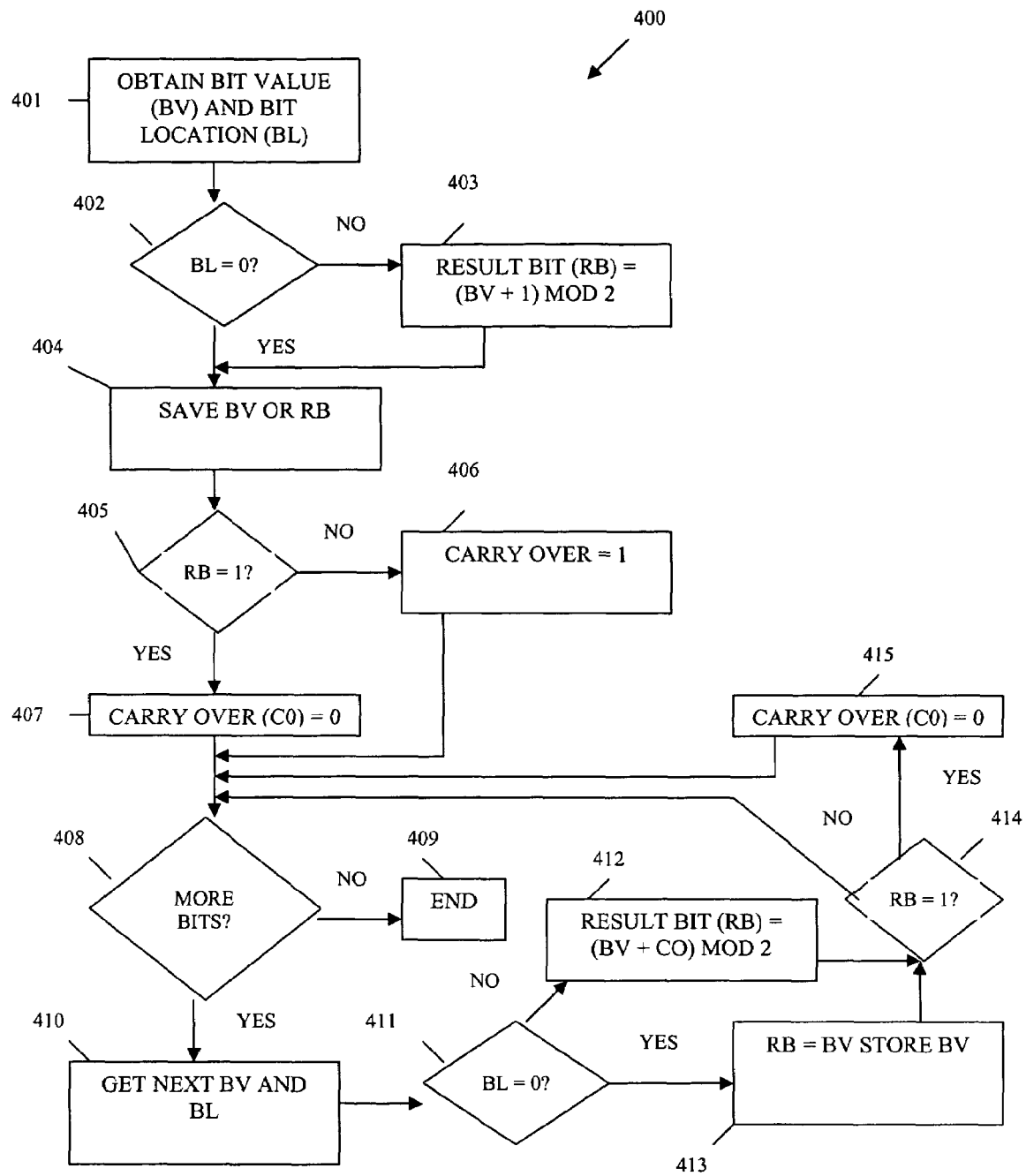
FIG. 4 is a diagram of a method for translating captured glyph bit patterns into position information, according to an example embodiment.

FIG. 4 depicts a method 400 for translating captured glyph patterns represented as bit values into position information, according to an example embodiment of the invention. The method 400 is implemented in a machine-accessible and readable medium and is optionally accessible over a network. In one embodiment, the method 400 is interfaced to and performs portions of the processing associated with the methods 200 and 300 of FIGS. 2 and 3. That is, the method 400 assists in resolving position information for captured glyph patterns.

The processing of the method 400 may be processed for a position associated with each dimension of a captured block of glyph patterns. So, the description presented herein can be independently processed by the method for an X axis or width dimension and for a Y axis or height dimension. Correspondingly, the description presented herein is described for a single dimension. Moreover, it should be noted that for efficiency purposes the method 400 may be processed in parallel as duplicate processing instances for the method 400, where one instance is for one dimension of the captured glyph patterns (captured block) and the other concurrent instance is for a different dimension of the captured block.

Initially, the glyphs are translated into bit values. One way to do this is use a lookup table to acquire bit values for a given glyph. The captured block of glyphs is thus translated into a codeword of bit values. This code word represents the rearranged block (M') associated with the captured block as was described in the example above with respect to FIG. 2. Moreover, the supplemental matrixes SUPP$_X$ and SUPP$_Y$ are acquired such that each bit value (BV) within the codeword corresponds also to a bit location (BL) within the supplemental matrixes. The dimensional position being processed by the method 400 will determine which supplemental matrix that is used for processing. Thus, when a width or X axis dimension is being processed SUPP$_X$ is used and when a height or Y axis dimension is being processed SUPP$_Y$ is used.

At 401, the BV and BL are parsed from the codeword and the supplemental matrix (SM). At 402, a check is made to see if the BL is 0, if it is not, at 403, then a result bit (RB) is set to (BV+1) MOD 2; where MOD is a modules operation. If the BL is 0, then the BV is saved (RB=BV). At 405, a check is made to see if the RB=1, if it is not, at 406, a carry over bit (CO) is set to 1. If the RB=1, then, at 407, the CO is set to 0.

At 408, a check is made to see if more BVs are unprocessed within the codeword. If no more BVs are available, then processing ends, at 409. If more BVs are available, then, at 410, the next BV is acquired from the codeword. Next, at 411 a check is made to determine if the BL is 0. If the BL is not 0, then, at 412, the RB=(BV+CO) MOD 2. If BL=0, then, at 413, RB=BV and the BV is saved or retained. At 414, the RB is checked to see if it is 1. If the RB is not 1, then, processing continues at 408. If the RB is 1, then, at 415, the CO is set to 0 and processing resumes at 408.

The saved BVs result in a string of bits which translate directly into a number. That number is one coordinate position for the dimension that was being processed. In some embodiments, the position is further altered in the following manner: Position=(Position*dimension (height or width))−dimension offset.

The method 400 presents a technique for converting or translating a coordinate for a captured block of glyphs. The coordinate corresponds to a location within a reference grid for a given unit of print media. This provides initial orientation for digital input devices that are interfacing with instances of the print media that incorporate patterns of encoded glyphs, such as those patterns generated by method 100 (encoder) of FIG. 1.

An example application of method 400 is now presented for purposes of illustration only. This example incorporates portions of the initial processing performed above with the method 200 for purposes of rearranging an initial captured block of glyphs and acquiring supplemental matrixes. Therefore, consider the following example application of methods 200 and 400, which resolves a coordinate position for a captured block within a unit of print media represented by a reference grid based on its dimensions or print media type (having defined dimensions).

Assume an initial glyph pattern representing a zigzag encoding scheme. The zigzag may appear as follows:⋜

In this particular example, the position of each block within a given reference grid for a given unit of print media has a top left bit that is the most significant (where the pattern begins) and a bottom right bit which is least significant (where the pattern ends).

An entire grid is translated into bit values (BVs) for a whole zigzag pattern. That is, the figures (images) associated with the glyphs in the grid are translated or mapped to their corresponding bit values (BVs). Each glyph is capable of coding two bits of information. Each glyph includes a BV for the X axis (width) and also includes a BV for the Y axis (height). Moreover, the block width for sub-patterns within the entire grid is 2 and the block height is 2. Therefore, the sup-patterns are square shapes and obtainable from blocks that comprise the entire grid. An example portion of a view for such a pattern as it may appear on its grid in BV translated form is listed below in Table F. Table F also shows a sampled captured 2×2 block, and again the X axis increases from left to right and begins at position 0, and the Y axis increases from top to bottom and begins at position 0. The sample pattern for the zigzag may appear as follows:

TABLE F

Sample Bit Values for a Zigzag Pattern
with Captured Block Selection Illustrated
POSITIONING PATTERN

```
0.0 0.0 | 0.0 0.0 | 0.0 0.0 | 0.0 0.0 0.0 1.0 0.0 1.0 0.0 1.0 0.0 1.0 1.0 0.0 1.0 0.0 1.0 0.0 1.0 0.0 1.0 1.0 1.0 1.0 1.0 1.0 1.0 1
0.0 0.0 | 0.0 1.0 | 1.0 0.0 | 1.0 1.0 0.0 0.0 0.0 1.0 1.0 0.0 1.0 1.0 0.0 0.0 0.0 1.0 1.0 0.0 1.0 1.0 0.0 0.0 0.0 1.0 1.0 0.0 1.0 1
0.0 0.0 | 0.0 0.0 | 0.0 0.0 | 0.0 0.0 0.0 1.0 0.0 1.0 0.0 1.0 0.0 1.0 1.0 0.0 1.0 0.0 1.0 0.0 1.0 0.0 1.0 1.0 1.0 1.0 1.0 1.0 1.0 1
0.0 0.1 | 0.0 1.1 | 1.0 0.1 | 1.0 1.1 0.0 0.1 0.0 1.1 1.0 0.1 1.0 1.1 0.0 0.1 0.0 1.1 1.0 0.1 1.0 1.1 0.0 0.1 0.0 1.1 1.0 0.1 1.0 1
0.0 0.0 | 0.0 0.0 | 0.0 0.0 | 0.0 0.0 0.0 1.0 0.0 1.0 0.0 1.0 0.0 1.0 1.0 0.0 1.0 0.0 1.0 0.0 1.0 0.0 1.0 1.0 1.0 1.0 1.0 1.0 1.0 1
0.1 0.0 | 0.1 1.1 | 1.1 0.0 | 1.1 1.0 0.1 0.0 0.1 1.0 1.1 0.0 1.1 1.0 0.1 0.0 0.1 1.0 1.1 0.0 1.1 1.0 0.1 0.0 0.1 1.0 1.1 0.0 1.1 1
0.0 0.0 | 0.0 0.0 | 0.0 0.0 | 0.0 0.0 0.0 1.0 0.0 1.0 0.0 1.0 0.0 1.0 1.0 0.0 1.0 0.0 1.0 1.0 0.0 1.0 1.0 1.0 1.0 1.0 1.0 1.0 1.0 1
0.1 0.1 | 0.1 1.1 | 1.1 0.1 | 1.1 1.1 0.1 0.1 0.1 1.1 1.1 0.1 1.1 1.1 0.1 0.1 0.1 1.1 1.1 0.1 1.0 1.1 0.1 0.1 0.1 1.1 1.1 0.1 1.1 1
0.0 0.1 | 0.0 0.1 | 0.0 0.1 | 0.0 0.1 0.0 1.1 0.0 1.1 0.0 1.1 0.0 1.1 1.0 0.1 1.0 0.1 1.0 0.1 1.0 0.1 1.0 1.0 1.0 1.0 1.0 1.0 1.0 1
0.0 0.0 | 0.0 1.0 | 1.0 0.0 | 1.0 1.0 0.0 0.0 0.0 1.0 1.0 0.0 1.0 1.0 0.0 0.0 0.0 1.0 1.0 0.0 1.0 1.0 0.0 0.0 0.0 1.0 1.0 0.0 1.0 1
0.0 0.1 | 0.0 0.1 | 0.0 0.1 | 0.0 0.1 0.0 1.1 0.0 1.1 0.0 1.1 0.0 1.1 1.0 0.1 1.0 0.1 1.0 0.1 1.0 0.1 1.0 1.1 1.0 1.1 1.0 1.1 1.0 1
0.0 0.1 | 0.0 1.1 | 1.0 0.1 | 1.0 1.1 0.0 0.1 0.0 1.1 1.0 0.1 1.0 1.1 0.0 0.1 0.0 1.1 1.0 0.1 1.0 1.1 0.0 0.1 0.0 1.1 1.0 0.1 1.0 1
0.0 0.1 | 0.0 0.1 | 0.0 0.1 | 0.0 0.1 0.0 1.1 0.0 1.1 0.0 1.1 0.0 1.1 1.0 0.1 1.0 0.1 1.0 0.1 1.1 0.1 1.0 1.1 1.0 1.1 1.0 1.1 1.0 1
0.1 0.0 | 0.1 1.0 | 1.1 0.0 | 1.1 1.0 0.1 0.0 0.1 1.0 1.1 0.0 1.1 1.0 0.1 0.0 0.1 1.0 1.1 0.0 1.0 1.0 0.1 0.0 0.1 1.0 1.1 0.0 1.1 1
0.0 0.1 | 0.0 0.1 | 0.0 0.1 | 0.0 0.1 0.0 1.1 0.0 1.1 0.0 1.1 0.0 1.1 1.0 0.1 1.0 0.1 1.0 0.1 1.0 0.1 1.0 1.1 1.0 1.1 1.0 1.1 1.0 1
0.1 0.1 | 0.1 1.1 | 1.1 0.1 | 1.1 1.1 0.1 0.1 0.1 1.1 1.1 0.1 1.1 1.1 0.1 0.1 0.1 1.1 1.1 0.1 1.1 1.1 0.1 0.1 0.1 1.1 1.1 0.1 1.1 1
0.1 0.0 | 0.1 0.0 | 0.1 0.0 | 0.1 0.0 0.1 1.0 0.1 1.0 0.1 1.0 0.1 1.0 1.1 0.0 1.1 0.0 1.1 0.0 1.1 0.0 1.1 1.0 1.1 1.0 1.1 1.0 1.1 1
0.0 0.0 | 0.0 1.0 | 1.0 0.0 | 1.0 1.0 0.0 0.0 0.0 1.0 1.0 0.0 1.0 1.0 0.0 0.0 0.0 1.0 1.0 0.0 1.0 1.0 0.0 0.0 0.0 1.0 1.0 0.0 1.0 1
0.1 0.0 | 0.1 0.0 | 0.1 0.0 | 0.1 0.0 0.1 1.0 0.1 1.0 0.1 1.0 0.1 1.0 1.1 0.0 1.1 0.0 1.1 0.0 1.1 0.0 1.1 1.0 1.1 1.0 1.1 1.0 1.1 1
0.0 0.1 | 0.0 1.1 | 1.0 0.1 | 1.0 1.1 0.0 0.1 0.0 1.1 1.0 0.1 1.0 1.1 0.0 0.1 0.0 1.1 1.0 0.1 0.0 1.1 0.0 0.1 0.0 1.1 1.0 0.1 1.0 1
0.1 0.0 | 0.1 0.0 | 0.1 0.0 | 0.1 0.0 0.1 1.0 0.1 1.0 0.1 1.0 0.1 1.0 1.1 0.0 1.1 0.0 1.1 0.0 1.1 0.0 1.1 1.0 1.1 1.0 1.1 1.0 1.1 1
0.1 0.0 | 0.1 1.0 | 1.1 0.0 | 1.1 1.0 0.1 0.0 0.1 1.0 1.1 0.0 1.1 1.0 0.1 0.0 0.1 1.0 1.1 0.0 1.0 0.0 0.1 0.0 0.1 1.0 1.1 0.0 1.1 1
0.1 0.0 | 0.1 0.0 | 0.1 0.0 | 0.1 0.0 0.1 1.0 0.1 1.0 0.1 1.0 0.1 1.0 1.1 0.0 1.1 0.0 1.1 0.0 1.1 0.0 1.1 1.0 1.1 1.0 1.1 1.0 1.1 1
0.1 0.1 | 0.1 1.1 | 1.1 0.1 | 1.1 1.1 0.1 0.1 0.1 1.1 1.1 0.1 1.1 1.1 0.1 0.1 0.1 1.1 1.1 0.1 1.1 1.1 0.1 0.1 0.1 1.1 1.1 0.1 1.1 1
0.1 0.1 | 0.1 0.1 | 0.1 0.1 | 0.1 0.1 0.1 1.1 0.1 1.1 0.1 1.1 0.1 1.1 1.1 0.1 1.1 0.1 1.1 0.1 1.1 0.1 1.1 1.1 1.1 1.1 1.1 1.1 1.1 1
0.0 0.0 | 0.0 1.0 | 1.0 0.0 | 1.0 1.0 0.0 0.0 0.0 1.0 1.0 0.0 1.0 1.0 0.0 0.0 0.0 1.0 1.0 0.0 1.0 1.0 0.0 0.0 0.0 1.0 1.0 0.0 1.0 1
0.1 0.1 | 0.1 0.1 | 0.1 0.1 | 0.1 0.1 0.1 1.1 0.1 1.1 0.1 1.1 0.1 1.1 1.1 0.1 1.1 0.1 1.1 0.1 1.1 0.1 1.1 1.1 1.1 1.1 1.1 1.1 1.1 1
0.0 0.1 | 0.0 1.1 | 1.0 0.1 | 1.0 1.1 0.0 0.1 0.0 1.1 1.0 0.1 1.0 1.1 0.0 0.1 0.0 1.1 1.0 0.1 1.0 1.1 0.0 0.1 0.0 1.1 1.0 0.1 1.0 1
0.1 0.1 | 0.1 0.1 | 0.1 0.1 | 0.1 0.1 0.1 1.1 0.1 1.1 0.1 1.1 0.1 1.1 1.1 0.1 1.1 0.1 1.1 0.1 1.1 0.1 1.1 1.1 1.1 1.1 1.1 1.1 1.1 1
0.1 0.0 | 0.1 1.0 | 1.1 0.0 | 1.1 1.0 0.1 0.0 0.1 1.0 1.1 0.0 1.1 1.0 0.1 0.0 0.1 1.0 1.1 0.0 1.1 1.0 0.1 0.0 0.1 1.0 1.1 0.0 1.1 1
0.1 0.1 | 0.1 0.1 | 0.1 0.1 | 0.1 0.1 0.1 1.1 0.1 1.1 0.1 1.1 0.1 1.1 1.1 0.1 1.1 0.1 1.1 0.1 1.1 0.1 1.1 1.1 1.1 1.1 1.1 1.1 1.1 1
0.1 0.1 | 0.1 1.1 | 1.1 0.1 | 1.1 1.1 0.1 0.1 0.1 1.1 1.1 0.1 1.1 1.1 0.1 0.1 0.1 1.1 1.1 0.1 1.1 1.1 0.1 0.1 0.1 1.1 1.1 0.1 1.1 1
```

The captured block is identified with a circle in Table F and appears as follows:

| 1, 1 | 1, 0 |
|------|------|
| 0, 0 | 0, 0 |

Isolating the X axis for BVs yields:

$$X: \begin{matrix} 1 & 1 \\ 0 & 0 \end{matrix}$$

Isolating the Y Axis for BVs yields:

$$Y: \begin{matrix} 1 & 0 \\ 0 & 0 \end{matrix}$$

The block size is 2×2 for the original reference grid and the captured block is also 2×2. Therefore, the X offset is 1 and the Y offset is 1. This is so, because if the captured block is moved one direction along the X axis it would occur on an original reference grid X axis block boundary, and if the captured block is moved one direction along the Y axis it would occur on an original reference grid Y axis boundary.

Next, the captured block is rearranged using the techniques presented in the method 200 of FIG. 2. Using the X axis's BVs and the calculations presented in method 200, the rearranged X BVs are:

$$X' = \begin{matrix} 0 & 0 \\ 1 & 1 \end{matrix}$$

X' is derived using the calculations in the method 200 as follows. First, the new rearranged coordinate positions for the rearranged block are obtained for both the X and Y axis for each original BV's position.

Original X axis position 0 ($X_0$) coordinate ($C$)=(0,0) (top left)=0.

Original X axis position 1 ($X_1$)$C$=(1,0)(top right)=1.

Original X axis position 2 ($X_2$)$C$=(0,1)(bottom left) =0.

Original X axis position 3 ($X_3$)$C$=(1,1)(bottom right) =1.

Original Y axis position 0 ($Y_0$)$C$=(0,0)(top left)=0.

Original Y axis position 1 ($Y_1$)$C$=(0,0)(top right)=0.

Original Y axis position 2 ($Y_2$)$C$=(0,1)(bottom left) =1.

Original Y axis position 3 ($Y_3$)$C$=(1,1)(bottom right) =1.

With this, the calculations are performed to get the rearranged positions for the rearranged block for both the X axis and Y axis. For example, the rearranged position in X' for $X_0Y_0$ is represented as $X'_0Y'_0$ and calculated as:

$X'_0 = 0(X_0) + 1(X \text{ offset}) \text{MOD } 2(\text{Block Width}) = 1(X \text{ axis}).$ $Y'_0 = 0(Y_0) + 1(Y \text{ offset}) \text{MOD } 2(\text{Block Height}) = 1(Y \text{ axis}).$ Thus, the rearranged coordinate position for original $X'_0 Y'_0$ (originally $C=(0,0)$) is now $C=(1,1)$ or $X'_0 Y'_0 = (1,1)$. So, the BV originally in $X'_0 Y'_0$ (BV=1,1) is now in $C=(1,1)$ in the rearranged block.

The calculations may be repeated for the other remaining positions of X, such that X' and a Y' are derived and a new rearranged version of the captured block becomes:

$$R = \begin{matrix} 0,0 & 0,0 \\ 1,0 & 1,1 \end{matrix}$$

such that:

$$X' = \begin{matrix} 0 & 0 \\ 1 & 1 \end{matrix}$$

and:

$$Y' = \begin{matrix} 0 & 0 \\ 0 & 1 \end{matrix}$$

Next, the original captured block is inspected against the rearranged block for each dimension separately to determine if an original BV in the original block moved along the axis in the new rearranged block. The original captured block was:

| | |
|---|---|
| 1, 1 | 1, 0 |
| 0, 0 | 0, 0 |

This captured block was rearranged to:

| | |
|---|---|
| 0, 0 | 0, 0 |
| 1, 0 | 1, 1 |

Thus, with respect to X values any movement to a different X axis position between the original X position and the rearranged X position for a particular value is represented as a −1 in an X dimension supplemental matrix. The same is true for the Y dimension to generate a Y dimension supplemental matrix. The values of 0 or −1 map to the rearranged BV's of X' for the X axis and also map to the rearranged BV's of Y' for the Y axis. For example, X' and its supplemental mapping BL matrix appears as follows in the present example:

$$X' = \begin{matrix} 0 & 0 \\ 1 & 1 \end{matrix} \quad BL \text{ of } X' = \begin{matrix} 0 & -1 \\ 0 & -1 \end{matrix}$$

The BVs of X' may be expressed as a codeword, such as X'="0 0 1 1" and the supplemental X' matrix as BL="01 01." This is similarly done for Y' to get a Y's BL supplemental matrix. However, because application of the X axis and Y axis are similar, only the X axis is illustrated further herein.

Armed with the codeword and the BL for X', the method 400 is used to resolve an X axis coordinate position within the overall reference grid of Table F for the captured block (identified with a circle in Table F). Processing starts with the least significant bit of the codeword (the most significant bit in the zigzag pattern of Table F begins in the top left, so we begin in the bottom right). That is, the processing parses the codeword backwards beginning at the least significant bit and working back to the most significant bit. This is done because the processing builds a binary string, which begins at the right and works to the left. Thus, when the string is converted to decimal, the proper orientation is already resolved. Other arrangements are possible where proper conversions are made to adjust for the other arrangements.

The codeword can then be logically viewed in reverse order as "11 0 0" and the BL is also logically viewed in reverse order as "−1 01 0." Table G below shows the block number of FIG. 4's processing and values for the processing at each block for the BV of the codeword, corresponding BL, carry over (CO), Result Bit (RB), and saved RB values (SRBs). The SRBs comprise a bit value which when translated to decimal (from binary representation) gives an X axis position for the originally captured block of Table F. This X position value is further adjusted to get an accurate X position within the entire grid of Table F for the captured block (described after the example processing Table G). The processing Table G for the reversed codeword "11 0 0" and the reversed BL "−1 0 −1 0" is as follows:

TABLE G

Example Processing Table for Method 400 of FIG. 4

| Block # FIG. 4 | BV | BL | CO | RB | SRB |
|---|---|---|---|---|---|
| 401 | 1 | −1 | 0 | ? | NA |
| 403 | 1 | −1 | 0 | 0 | NA |
| 408 | 1 | −1 | 1 | 0 | 0 |
| 410 | 1 | 0 | 1 | ? | NA |
| 413 | 1 | 0 | 1 | 1 | NA |
| 415 | 1 | 0 | 0 | 1 | 1 |
| 410 | 0 | −1 | 0 | ? | NA |
| 412 | 0 | −1 | 0 | 0 | 0 |
| 410 | 0 | 0 | 0 | ? | NA |
| 413 | 0 | 0 | 0 | 0 | 0 |

The resulting SRB from Table G is "0 0 1 0." Again, because of reversal before processing initiated, the rightmost bit in the SRB is the least significant. The SRB is a binary string value (base 2), conversion to decimal value (base 10) yields 2 or $2^1$, since the only 1 appears in the $2^{1th}$ position of the SRB.

Next, the value 2 is altered to get a final X position for the X axis in the entire grid of Table F for the original captured block in this manner (also described above with the method 200 of FIG. 4):

X grid position for captured block=2(calculated in Table G)*2(block width in the example)−1 (X offset in the example)=3.

Thus, the original captured block occupies X axis position 3 in Table F, where the first position begins with 0 (which has been the case in all the examples presented herein). Inspection of Table F for the starting X axis position of the captured block reveals that position 3 is indeed correct. In a similar manner, the processing of the method 400 may be used against Y' and its BL to yield a Y axis starting position in the grid of Table F for the captured block as position 3, where the first position begins with 0.

It is now apparent to one of ordinary skill in the art, how the techniques presented herein may be implemented to resolve absolute positions within reference grids for any captured block of glyphs, even when the captured block spans multiple patterns with the grids.

Figure 5:
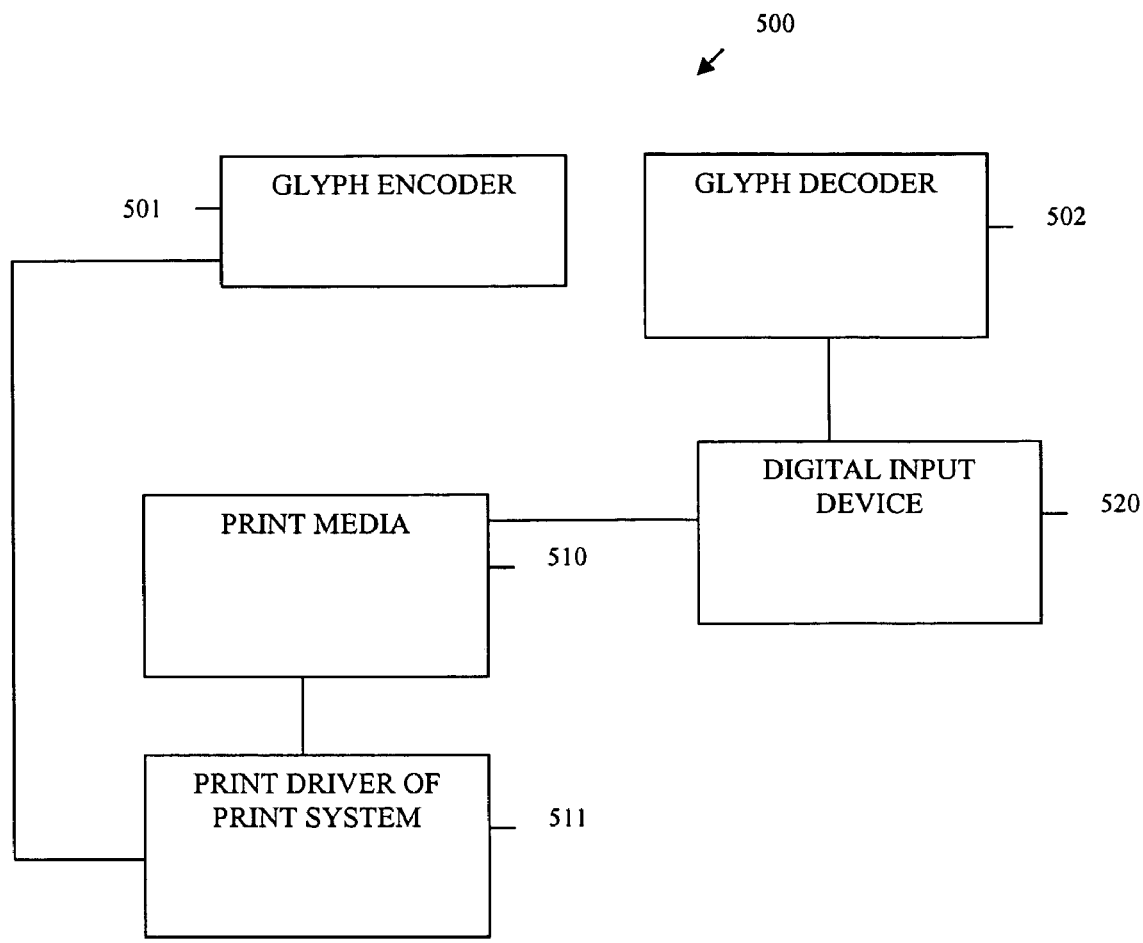
FIG. 5 is a diagram of a glyph encoding and decoding system, according to an example embodiment.

FIG. 5 is a diagram of a glyph encoding and decoding system 500, according to an example embodiment. The glyph encoding and decoding system 500 is implemented in a machine-accessible and readable medium and is optionally accessible over a network. In one embodiment, the glyph encoding and decoding system 500 implements, among other things, the methods 100, 200, 300, and/or 400 of FIGS. 1-4.

The glyph encoding and decoding system 500 includes a glyph encoder 501 and a glyph decoder 502. The glyph encoder 501 may be implemented in a different processing environment from an environment associated with the glyph decoder 502. However, in one embodiment, both the glyph encoder 501 and glyph decoder are implemented in the same processing environment.

The glyph encoder 501 is configured for processing with a given type or unit of print media. Optionally, the glyph encoder 501 may also receive glyph block sizes or dimensions. Once configured, the glyph encoder 501 acquires a reference grid for a given unit of print media. Next, the glyph encoder 501 acquires glyphs from a glyph alphabet and generates continuous patterns of selective groups of the glyphs as unique blocks. Each block associated with a given position within the reference grid. The patterns for the reference grid are then communicated to a requestor. In one embodiment, the glyph encoder 501 is implemented within a printer driver service that communicates with a print system, which subsequently outputs the patterns on instances of the print media 510.

In one embodiment, the requester is a print driver or a print system 511, such as an infrared print system. The print system 511 receives the pattern and prints it on instances of the unit of print media 510. In another embodiment, the requester is a database service, and the glyph encoder 501 supplies the patterns and a type or print media or the given unit of print media to the database service. The database indexes the patterns with the type and makes it available to print drivers or systems when requested through the database service.

At some point the patterns produced by the glyph encoder 501 are printed on a surface of print media 510. The print media 510 is then interfaced with by a writer equipped with a digital input device 520 (e.g., digital pen, stylus, camera, etc.). The digital input device 520 then communicates or is interfaced with the glyph decoder 502.

The digital input device 520 when moved over the surface of the print media 510 captures a block of glyphs as an image and transmits the same to the glyph decoder 502. The glyph decoder recognizes the image a group of block of glyphs associated with different patterns originally encoded on the surface by the glyph encoder 501. The glyph decoder 502 then performs processing discussed above with respect to methods 200, 300, and/or 400 in order to resolve a coordinate position for digital input device 520 above the surface of the print media 510 with respect to a reference grid associated with the print media 510. The digital input device 520 is then tracked to record movements of the writer over the surface from the initial orientation resolved as the coordinate position.

In one embodiment, the glyph encoder 501 is a means for generating continuous patterns implemented as a service within a machine-accessible and readable medium. Moreover, the glyph decoder 502 is a means for decoding a given block of glyphs into a current position, where the current position is determined irrespective of an original orientation of the given block. That is, the given block may include glyphs from multiple patterns or blocks originally printed on an instance of the print media 501. The digital input device 520 may also be a means for capturing the given block. Also, the print driver or the print system 511 may be a means for printing the continuous pattern on the print media 510.

Figure 6:
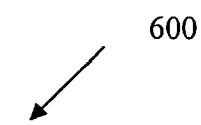
FIG. 6 is a diagram of print media having glyph patterns printed thereon, according to an example embodiment.

FIG. 6 is diagram of a print media 600 having glyph patterns printed thereon, according to an example embodiment. FIG. 6 is presented for purposes of illustration only, and the stars represent glyphs. The stars are there for purposes of illustrating glyphs forming patterns on a surface of the print media 600. Each pattern when the glyphs are organized according to embodiments of this invention into blocks is unique and minimally conveys a position of each block on the surface of the print media 600.

The print media may be any material capable of recording patterns of encoded glyphs by means of ink. For example, the material may be paper, wood, metal, plastic, cloth, glass, food, and the like. Moreover, the print media has a given and configurable height and width dimensions. In one embodiment, the patterns are printed onto the surface of the print media 600 using infrared technology, such that the patterns are only visible to devices capable of reading infrared ink occurring on the surface of the print media 600.

The print media 600 records the patterns from processing associated with the methods 100, 300, or the system 500. Moreover, the print media 600 is interfaced to a digital input device and a decoding technique, such as the ones discussed in the methods 200, 400, or the system 500. The decoding technique recognizes a captured block of glyphs printed on the surface of the print media 600 and decodes the block into a coordinate position associated with a reference grid that models the entire surface of the print media 600 in an electronic environment. In this manner, an initial orientation over the surface is acquired and capable of being tracked within the electronic environment.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method comprising:
generating a configurable number of blocks, wherein each block is a unique pattern of glyphs, and wherein each pattern identifies a unique position on a surface of a unit of print media, wherein a desired current position for any given glyph or subset of glyphs can be derived from captured portions of different ones of the unique patterns where the portions of the different ones of the unique patterns span multiple blocks, and wherein the current position for any given glyph represents an orientation on the surface of a particular instance of the unit of print media and the current position capable of being subsequently resolved by a digital input device capturing the portions of the different ones of the unique patterns and deriving a correct block and correct pattern to resolve the orientation; and
outputting the patterns for subsequent delivery to instances of the unit of print media.

2. The method of claim 1 further comprising, receiving dimension sizes for the unit of print media, wherein the dimensions resolve the configurable number of the blocks which are generated.

3. The method of claim 1 further comprising, receiving a block size as a configurable parameter that resolves a total number of the glyphs represented within each block.

4. The method of claim 1 further comprising, receiving a block dimension as a configurable parameter that resolves a block size, and wherein the block size resolves a total number of the glyphs represented within each block.

5. The method of claim 1 further comprising, communicating the patterns to a print service for subsequent output of the patterns onto the instances of the unit of print media.

6. The method of claim 1 further comprising, storing the patterns for subsequent access.

7. The method of claim 6 further comprising, indexing the patterns in a data store, wherein the patterns are indexed on at least one of the unit of print media and a type of print media.

8. A method comprising:
receiving an original block of glyphs representing portions of unique patterns of glyphs captured from a digital input device;
rearranging the original block, wherein each glyph within the rearranged block is situated in a position as each glyph appears in each glyph's one of the unique patterns;
generating supplementary information that indicates for each rearranged glyph whether each glyph is or is not also in the original block; and
decoding the glyphs of the rearranged blocks into bit values and using the bit values and the supplemental information to acquire position information for the original block that identifies orientation for the digital input device on a surface for an instance of a unit of print media being read by the digital input device.

9. The method of claim 8, wherein generating the supplemental information further includes generating a first matrix for a first dimension of the rearranged block and a second matrix for a second dimension of the rearranged block.

10. The method of claim 9, wherein decoding further includes separately resolving a first position for the first dimension in response to the first matrix and a second position for the second dimension in response to the second dimension, and wherein the first and second positions form a coordinate on the surface of the instance of the unit of print media that represents the position information.

11. The method of claim 8, wherein decoding further includes acquiring the position information as a coordinate representing two dimensions on the surface of the instance of the unit of print media.

12. The method of claim 8, wherein decoding further includes augmenting the position information by offset values for two dimensions associated with the original block.

13. The method of claim 12, wherein decoding further includes augmenting the two dimensions by a first dimension representing height for the original block and a second dimension representing width for the original block.

14. A system, comprising:
means for generating a continuous patterns of glyphs, wherein each pattern encodes a position on instances of a unit of print media, and wherein each encoded position is relative to a surface associated with a particular instance of the unit of print media; and
means for decoding a given block of glyphs captured by a digital input device to provide a proper orientation for a current position above a particular surface of a given one of the instances, wherein the means for decoding processes the given block and translates the given block into the current position irrespective of an original orientation of the given block as originally captured by the digital input device.

15. The system of claim 14 further comprising, means for capturing the given block of glyphs from the given one of the instances and communicating the given block to the means for decoding.

16. The system of claim 14 further comprising, means for printing the continuous patterns onto the instances of the unit of print media.

17. A unit of print media, comprising:
a material having height and width dimensions, the material capable of recording infrared information; and
continuous patterns of glyphs printed as the infrared information onto a surface of the material, each pattern representing a unique position on the surface of the material, wherein any given position of a select one of the glyphs or select grouping of the glyphs is capable of being derived from portions of the continuous patterns that are subsequently captured by a digital input device, and wherein any given position provides a proper orientation relative to the height and width dimensions for the surface of the unit of print media.

18. The unit of print media of claim 17, wherein the material is paper.

19. The unit of print media of claim 17, wherein the continuous patterns of glyphs are printed onto the surface by an infrared printer.

20. The unit of print media of claim 17, wherein configurable portions of the continuous patterns are readable from an infrared digital camera that is the digital input device and decoded to resolve a current position over the surface.

21. A machine readable medium for encoding glyphs, the instructions when executed performing the method comprising:

receiving a dimension size for a unit of print media;

generating a select number of glyph patterns in response to the dimension size, wherein each glyph pattern encodes a unique position on a surface of the unit of print media relative to height and width dimensions associated with the dimension size, and wherein any given position on the surface is derivable from different portions of the patterns subsequently captured by a digital input device to provide a proper orientation of the digital input device above a surface of the unit of print media for any given position relative to the height and width dimensions of the unit of print media; and communicating the select number of glyph patterns to a requestor.

22. The medium of claim 21, wherein communicating further includes the instructions for transmitting the select number of glyph patterns to an infrared printing service, which is the requestor, wherein the infrared printing service prints the select number of glyph patterns onto the surface of an instance of the unit of print media.

23. The medium of claim 21, wherein communicating further includes the instructions for transmitting the select number of glyphs patterns to a data store service, which is the requestor, wherein the data store service associates the select number of glyph patterns with the unit of print media within a data store record.

24. The medium of claim 21 further comprising instructions for:

receiving an image representing a given block of glyphs captured from the surface of the unit of print media, wherein the given block spans different ones of the patterns; and decoding the block into a current position, wherein the current position is one of the available unique positions.

\* \* \* \* \*

UNITED STATES PATENT AND TRADEMARK OFFICE
CERTIFICATE OF CORRECTION

PATENT NO. : 7,240,849 B2 Page 1 of 1
APPLICATION NO. : 10/927915
DATED : July 10, 2007
INVENTOR(S) : Carles Ruiz Floriach et al.

It is certified that error appears in the above-identified patent and that said Letters Patent is hereby corrected as shown below:

In column 14, line 8, delete "BL="01 01."" and insert -- BL="0 -1 0 -1." --, therefor.

In column 14, line 32, delete ""-1 01 0."" and insert -- "-1 0 -1 0." --, therefor.

Signed and Sealed this

Sixteenth Day of September, 2008

JON W. DUDAS
*Director of the United States Patent and Trademark Office*